E. F. EWERS.
MOWING MACHINE.
APPLICATION FILED OCT. 30, 1908.
930,168.
Patented Aug. 3, 1909.
2 SHEETS—SHEET 2.
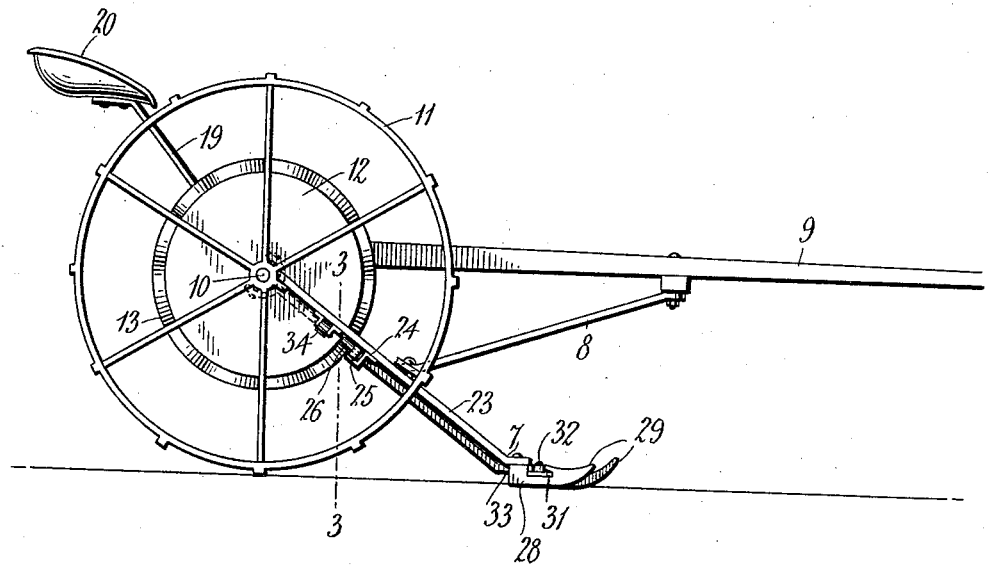
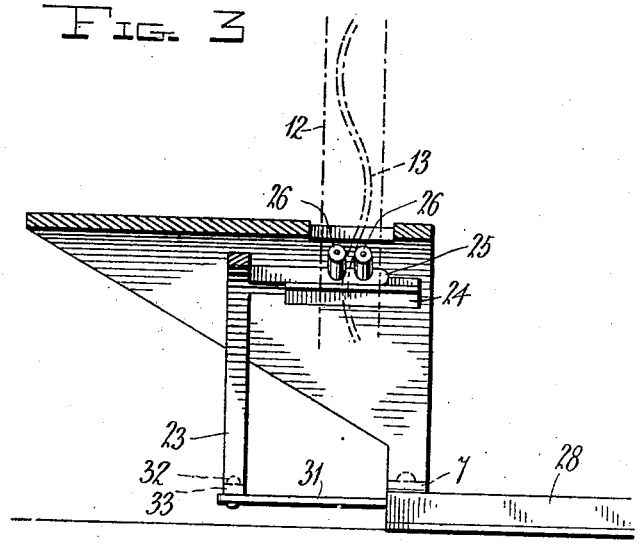

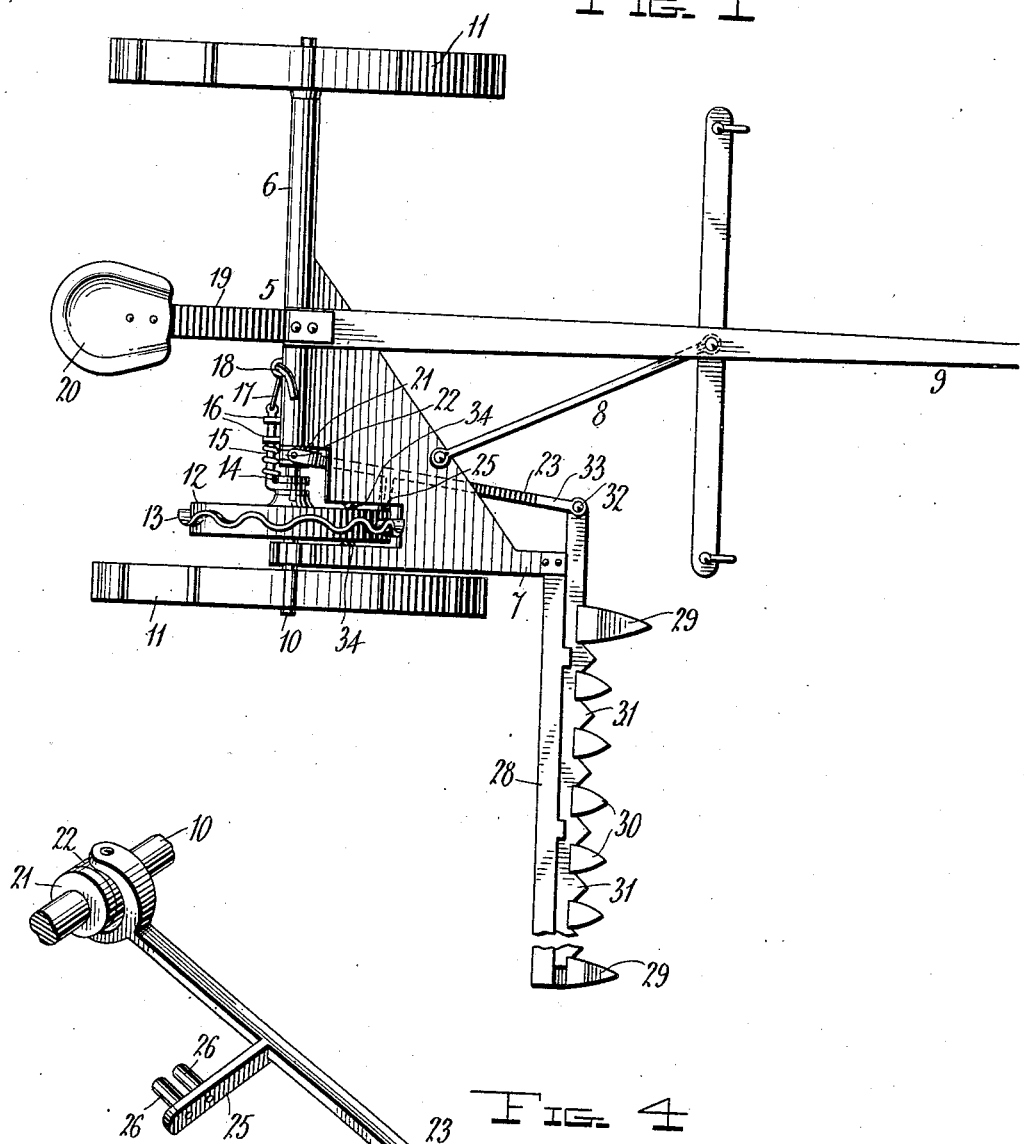

UNITED STATES PATENT OFFICE.

EDWIN F. EWERS, OF PHELPS, MICHIGAN.

MOWING-MACHINE.

No. 930,168.   Specification of Letters Patent.   Patented Aug. 3, 1909.

Application filed October 30, 1908. Serial No. 460,333.

*To all whom it may concern:*

Be it known that I, EDWIN F. EWERS, a citizen of the United States, residing at Phelps, in the county of Charlevoix, State of Michigan, have invented certain new and useful Improvements in Mowing-Machines; and I do hereby declare the following to be a full, clear, and exact description of the invention, such as will enable others skilled in the art to which it appertains to make and use the same.

The invention relates to mowing machines and more particularly to the class of mowing machines having mechanism which imparts to the knife its reciprocating motion.

The primary object of the invention is the provision of a mowing machine upon the main axle of which is mounted a waved cam wheel which latter actuates a reciprocating bar or pitman the same having connection with the cutter knife for operating the same whereby reciprocating motion will be imparted thereto during the forward travel of the machine.

Another object of the invention is the provision of a mowing machine having mechanism for imparting reciprocating motion to the knife and which mechanism is simple, thoroughly efficient and effective in its operation, the machine including a small number of parts and being inexpensive in the manufacture.

In the drawings accompanying and forming part of this specification is illustrated the improved form of embodiment of the invention which to enable those skilled in the art to practice the invention will be set forth at length in the following description while the novelty of the invention will be included in the claims succeeding said description.

In the drawings: Figure 1 is a top plan view of a mowing machine embodying the invention. Fig. 2 is a side elevation thereof. Fig. 3 is a sectional view on the line 3—3 of Fig. 2. Fig. 4 is a detail perspective view of the reciprocating actuating view bar for imparting motion to the knife.

Similar reference characters indicate corresponding parts throughout the several views in the drawings.

In the drawings, the numeral 5 designates the main frame of the mowing machine comprising the axle sheath 6, forwardly inclined arm 7 on the right hand side of the frame and the draft rod 8 connected to the frame and the evener bar to which the draft animals are attached. The tongue 9 is secured on the axle sheath 6 and carries the evener bar. The axle shaft 10 has its bearing in the axle sheath 6 and fixed on the ends of the axle shaft are the ground or traction wheels 11 which latter are of the usual or ordinary construction and are adapted to rotate the axle shaft in the axle sheath of the main frame.

On the axle shaft 10 is loosely mounted a cam wheel 12 the same provided at its periphery with a waved cam or rib 13 and adjacent one side of the cam wheel and splined on the axle shaft 10 is a clutch 14 adapted to engage the cam wheel to lock the latter to the axle shaft. Said clutch is engaged by a spring pressed operating rod 15 the same supported in guiding ears 16 on the rear side of the frame and connected to the said rod 15 by a link 17 is a foot lever 18. The said foot lever is arranged in close proximity to a spring leg 19 which supports a seat 20 to be occupied by the operator or rider of the machine.

Fixed to the axle shaft 10 a slight distance removed from the clutch 14 thereon is a grooved collar 21 the groove of which receives a slidable ring 22 having pivotally connected thereto the forked end of a laterally swinging actuating bar 23. Integral with and projecting from one side of the actuating bar 23 at right angles thereto is an arm 25, the latter works in a depending guide bracket 24 formed near the forward end of the main frame, the outer end of said arm 25 carries a pair of anti-friction rollers 26 which engage opposite sides of the waved cam or rib 13.

Extending outwardly from the forward end of the arm 7 is an arm 28 having at opposite ends shoes 29 and to which arm are attached fingers 30 in which is slidably mounted a sickle bar or knife 31 the same provided at its head with a stud 32 rising from the upper side thereof and pivotally connected to the stud is the angular portion 33 of the bar 23.

Mounted in the main frame at opposite sides of the cam wheel 12 near its periphery are guide rollers 34 the latter adapted to maintain the said wheel 12 against longitudinal displacement on the axle of the machine.

In operation, the cam wheel 12 is rotated through the medium of the axle shaft from the traction wheels 11 during the forward travel of the machine and which cam wheel communicates lateral movement to the actuating bar 23 through the arm 25 and anti-friction rollers 26 and reciprocating motion is communicated to the sickle bar 31 through the bar 23. By the clutch 14 and foot clutch lever 18 the cam wheel may be thrown into and out of gear.

What is claimed is—

1. The combination, in a mowing machine, of a frame, a wheeled axle journaled in the frame, a waved cam wheel loosely mounted upon the axle, clutch means for locking the cam wheel to the axle, a grooved collar fixed to the axle, an actuating bar having a forked end slidably connected to the grooved collar, an arm projecting outwardly at right angles from the actuating bar, anti-friction rollers supported by said arm and engaging the waved cam wheel, a finger bar mounted at the forward end of the frame, a cutter bar slidably supported on the finger bar and connected to the said actuating bar, a support on said frame forming a guideway for the arm on the actuating bar, and friction rollers mounted upon the frame and contacting with the cam wheel at opposite sides thereof to hold the same against lateral displacement on the axle.

2. The combination, in a mowing machine, of a main frame, an axle journaled in the main frame, traction wheels fixed to opposite ends of the said axle, a waved cam wheel loosely mounted upon the axle and adapted for rotation therewith, a clutch for locking the cam wheel with the axle, an actuating bar having a right angularly disposed arm, means forming pivotal connection for the inner end of the actuating bar and connected to the axle, anti-friction rollers carried by said arm and adapted to engage the waved cam wheel, means on the said frame forming a guideway for said arm, rollers carried by the main frame and engaging opposite sides of the waved cam wheel to hold the same against longitudinal movement on the axle, a finger bar carried by the said frame at the forward end thereof, a cutter bar on said finger bar and having pivotal connection with the outer end of the actuating bar, and manually operable means for operating the clutch.

In testimony whereof, I affix my signature, in presence of two witnesses.

EDWIN F. EWERS.

Witnesses:
E. R. HARRIS,
Mrs. E. E. EWERS.